Patented Aug. 16, 1932

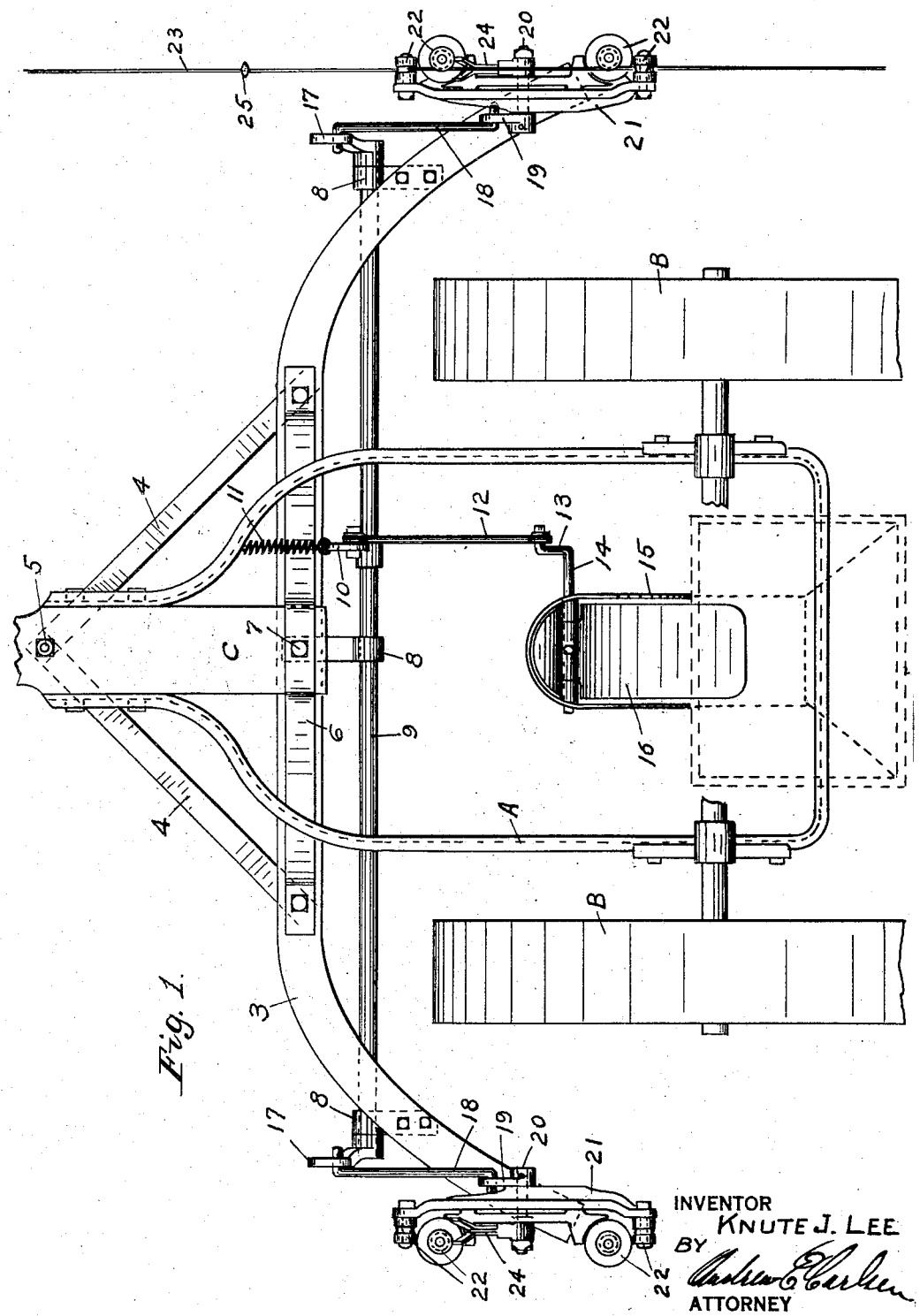

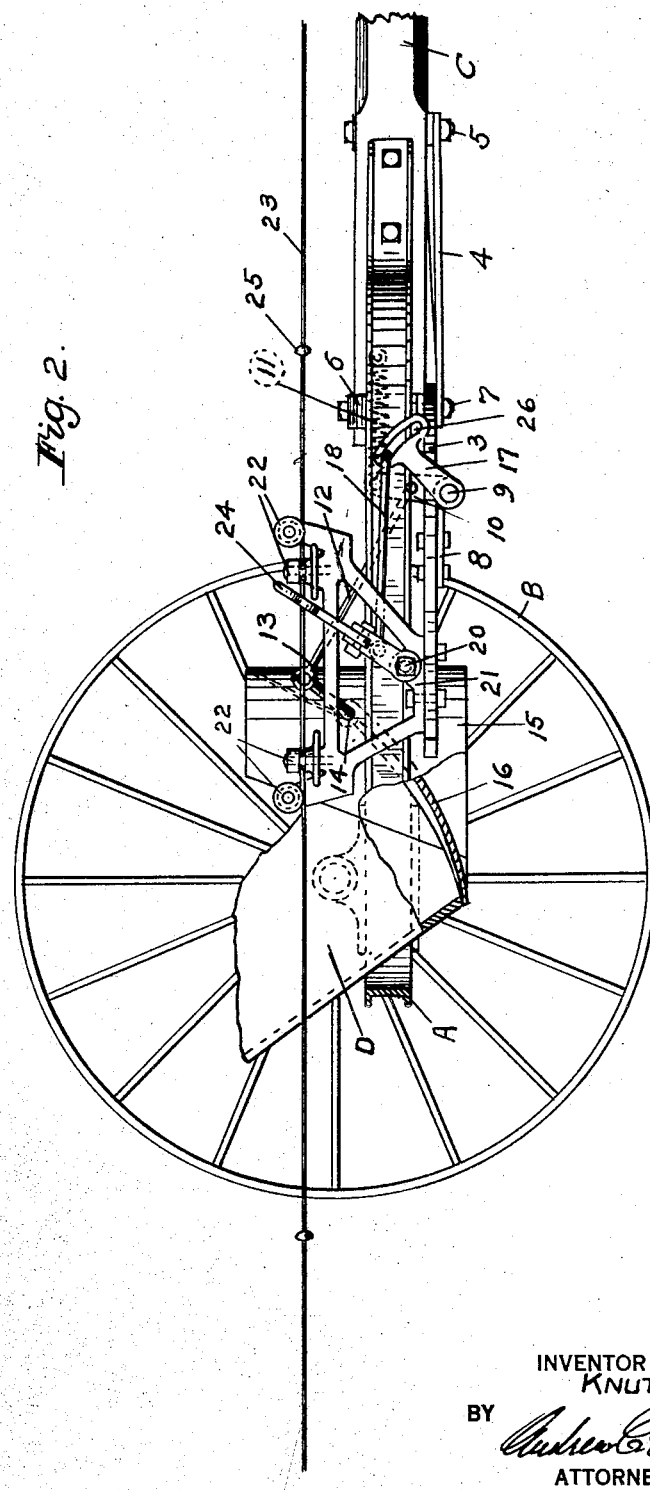

1,872,470

UNITED STATES PATENT OFFICE

KNUTE J. LEE, OF SHEVLIN, MINNESOTA

CHECKROW ATTACHMENT FOR POTATO PLANTERS

Application filed January 2, 1931. Serial No. 506,020.

This invention relates to potato or other tuber planting equipment, and the primary object is to provide an attachment particularly adapted for standard or conventional designs of potato planting machines that will control the spacings between the planted seed so that the crop may be conveniently cultivated both transversely as well as longitudinally of the crop row in much the same manner as is commonly done with corn crops. A further object is to provide an attachment of the character referred to that is efficient, practical, and comparatively simple in construction, and which can be easily and quickly applied to a conventional planter. These and other objects will be disclosed in the course of the following specification, reference being had to the accompanying drawings, wherein:

Fig. 1 is a plan view of a potato planter with the major portion of the planting mechanism removed for purpose of illustration and showing my improved check row mechanism as applied thereto.

Fig. 2 is a side elevation of the machine as seen from the right in Fig. 1, but with the near ground wheel removed and various portions broken away for purpose of illustration.

Referring to the drawings more particularly and by reference characters, A designates the main frame of the planter, the same being supported on ground wheels B. The front end of the frame A attaches to a tongue C by which the implement is drawn over the field.

My attachment is applicable to practically any form of potato planter and therefore no specific construction of planter is shown. It is understood, however, that the planter as such, includes a hopper for containing the seed potatoes and a mechanism for periodically delivering or conveying the seed from the hopper into a chute D from which they are normally dropped into an open furrow that is effected by a furrow shoe disposed forwardly of the machine, and the furrow is in turn closed after the seed have been dropped, by disks or other mechanisms which follow behind the furrow making device. As the furrow opening and closing devices form no part of the present invention, and are standard and well known types of equipment, they are also not shown in the present drawings although it is understood that these devices, as well as the tripper mechanism which delivers the potato seed into the chute D, are all essential parts of the potato planter as such.

It may further be explained that in conventional types of planters the potato seed are planted in rows over which the machine travels but that there is no provision for spacing the planted seed in such a manner that the crop can be cultivated transversely of as well as longitudinally of the rows. In other words, the seed is usually planted at more or less uneven intervals of from ten to twenty inches, and that there is no attempt to equalize these intervals of planting so that the crop will grow in rows transversely of the field, and as a result of this condition the crop can only be cultivated by a cultivator traveling longitudinally with respect to the planted rows.

The mechanism which I have designed to regulate the planting of the seed consists primarily of a transversely disposed yoke or cross beam 3 which is secured immediately under the rear end of the tongue C, and is rigidly braced with respect thereto by braces 4 attached as at 5 to the tongue C, and the reinforcing brace 6 which passes over the rear end of the tongue C, and is secured thereto as by a king bolt 7 which also passes through the cross beam 3. In this manner the beam is not only rigidly secured to the tongue C but the attached devices are so arranged that they may be quickly and easily secured in place without in any way interfering with the planter mechanism. It will be noted in Fig. 1 that the outer ends of the beam 3 are bent rearwardly so as to support the check row mechanisms in positions closer to the axes of the wheels B. The beam 3 is provided with spaced intervals with bearing brackets 8 in which is journaled a transverse shaft 9. At a point between its ends, the shaft 9 is provided with a relatively rigid upstanding arm 10 which is held in a forward position under the action of a spring 11. The arm 10 is connected by a link 12 to the crank 13 of a shaft 14 journaled in a guard member 15, arranged immediately in front of the dropper chute D so as to form an enclosure therewith. Within this enclosure the shaft 14 carries a trap door 16 which is so arranged that it will form a bottom or floor for the chute D so as to retain the potato seed dropped therein until it is opened under the action of one of the check row mechanisms.

At its ends the shaft 9 is provided with a pair of arms 17 connected by links 18 to arms 19 of short bolts or shafts 20 mounted in brackets 21 rigidly secured to the outer ends of the beam 3. The brackets 21 are provided with rollers 22 between which the check row wire 23 is guided as the machine moves over the field. Between the front and rear rollers of each bracket is arranged a forked arm 24 rigidly secured to the bolt or shaft 20 so as to oscillate therewith. These forked arms 24 are normally held in a forward position under the action of the spring 11, acting through the crank arm 17 and 19 and the links 18. As the machine moves over the field, however, the stops or enlargements 25 of the wire 23 engage one of the arms 24 and successively move it rearwardly until said enlargement disengages itself from the fork, at which time the fork may again move forwardly. This rearward movement of the arm 24 operates through the members 20, 19, 18, 17, 9, 10, 12, 13, and 14, to open the trap door 16, thus permitting the potato seed which has accumulated in the chute D to drop down into the previously formed furrow, and this action is of course repeated for each time that the tripper mechanism engages one of the members 25 of the check wire 23.

It will be noted that the arms 17 on the shaft 9 are provided with slots 26 in which the link members 18 are engaged. The purpose of these slots is to permit a proper and timely return of the tripper lever 24 to its normal position, even if the trap door 16 should not return to its normal closed position, as might be the case for instance should a potato seed become lodged in between the door and the chute D, or the guard 15. With this arrangement there will be nothing to prevent the proper manipulation of the tripper mechanism when the next enlargement 25 is reached, and consequently the tripper mechanism will always function properly even tho there may be disruption in the delivery part of the attachment.

The operation of the machine may be briefly described as follows: It may first be mentioned that while two tripper mechanisms are shown, one on each side of the machine, it is of course understood that only one is used at a time, and the selection of which mechanism is to be used depends entirely upon the seed, the wire 23 upon which the machine may be operating, and also the direction of the machine. The wire 23 is of course stretched across the field and is placed between various rollers 22 in substantially the same manner as is commonly done in similar mechanisms as used on conventional types of corn planters.

With the machine in operation there will now be delivered to the chute D potato seed at more or less regular intervals, the time element being determined entirely by adjustments to the tripper mechanism, but instead of dropping down onto the ground as is ordinarily the case, the seed accumulates upon the trap door 16. As the machine now moves forwardly the enlargements 25 on the wire 23, as previously noted, engage the tripper mechanism to actuate the door 16 and thus cause a delivery of the potatoes to the ground at predetermined regular intervals, and the only time element in determining the regularity with respect to these intervals are the enlargements 25 on the wires 23, and as a result it will be seen that the seed will be planted at uniformly equal intervals along each row that the machine travels, and consequently these rows may be cultivated by a cultivator machine which can travel transversely as well as longitudinally of the planted rows.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. The combination with a potato planter, of a door member for controlling the delivery of potato seed from the planter, a cross beam rigidly secured to the planter, check row mechanisms carried at the outer ends of said beam, a transversely arranged rocker shaft disposed adjacent to the cross beam, a connection between the shaft and said door member, and connections between said shaft and the check row mechanisms, said last mentioned connections including a slotted member and an element having limited freedom for movement therein whereby such movement may permit certain movements of the shaft with respect to the check row mechanisms.

2. An attachment for a potato planter having a delivery chute, comprising a cross beam for detachable connection with respect to the main frame of the planter, a shaft journaled with respect to, carried by and extending longitudinally of the beam, a door member hingedly mounted with respect to the said delivery chute of the planter, crank and link connections between the shaft and door member, and check row mechanisms at the ends of the cross beam for actuating the shaft as the planter moves over the field.

3. An attachment for a potato planter comprising a cross beam for detachable connection with respect to the main frame of the planter, a shaft journaled with respect to, carried by and extending longitudinally of the beam, a seed release door member hingedly mounted with respect to the planter, spring means for normally holding the door member in a closed position, an operative connection between the shaft and door member, and check row mechanisms carried by the cross beam for actuating the shaft.

4. An attachment for a potato planter having laterally disposed supporting wheels comprising a cross beam detachably secured to the planter in advance of the supporting wheels and having end portions extending rearwardly to points transversely beyond the supporting wheels, check row mechanisms carried by said end portions so as to be disposed substantially within the transverse vertical planes of the wheels, a shaft connecting said mechanisms and operative by either thereof, and a normally closed potato seed discharge door connected with said shaft so that it may be opened thereby when the latter is actuated by one of the check row mechanisms.

5. An attachment for a potato planter having laterally disposed supporting wheels comprising a cross beam detachably secured to the planter in advance of the supporting wheels and having end portions rearwardly to points transversely beyond the supporting wheels, check row mechanisms carried by said end portions so as to be disposed substantially within the transverse vertical planes of the wheels, a shaft connecting said mechanisms and operative by either thereof, bearing members for mounting the shaft directly upon the cross beam so as to be removable and attachable as a unit therewith, and a normally closed potato seed discharge door connected with said shaft so that it may be opened thereby when the latter is actuated by one of the check row mechanisms.

6. An attachment for a potato planter having a wheel supported frame, a draft tongue, and a delivery chute, comprising a cross beam detachably secured with respect to the frame and tongue and having end portions extending rearwardly so as to terminate at points laterally beyond but within the transverse vertical planes of the supporting wheels, check row mechanisms carried by said cross beam end portions, a shaft carried by the cross beam for selective actuation by said check row mechanisms, and a discharge control member for the delivery chute connected with said shaft.

Signed at Shevlin, Minnesota, this 22nd day of December, 1930.

KNUTE J. LEE.